Figure 2:
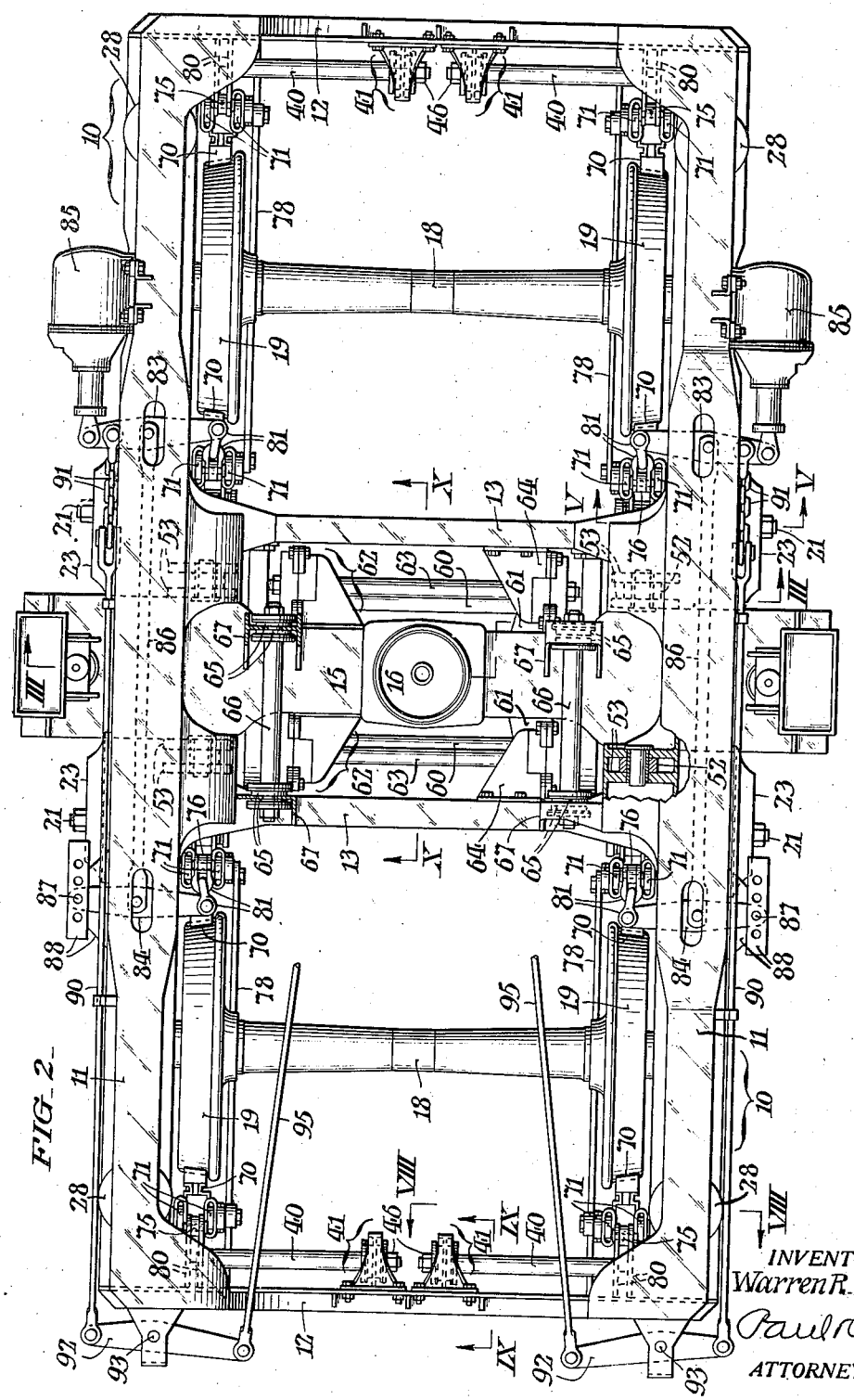

March 14, 1944.    W. R. ELSEY    2,344,033
RAILWAY CAR TRUCK
Filed Nov. 20, 1940    3 Sheets-Sheet 1
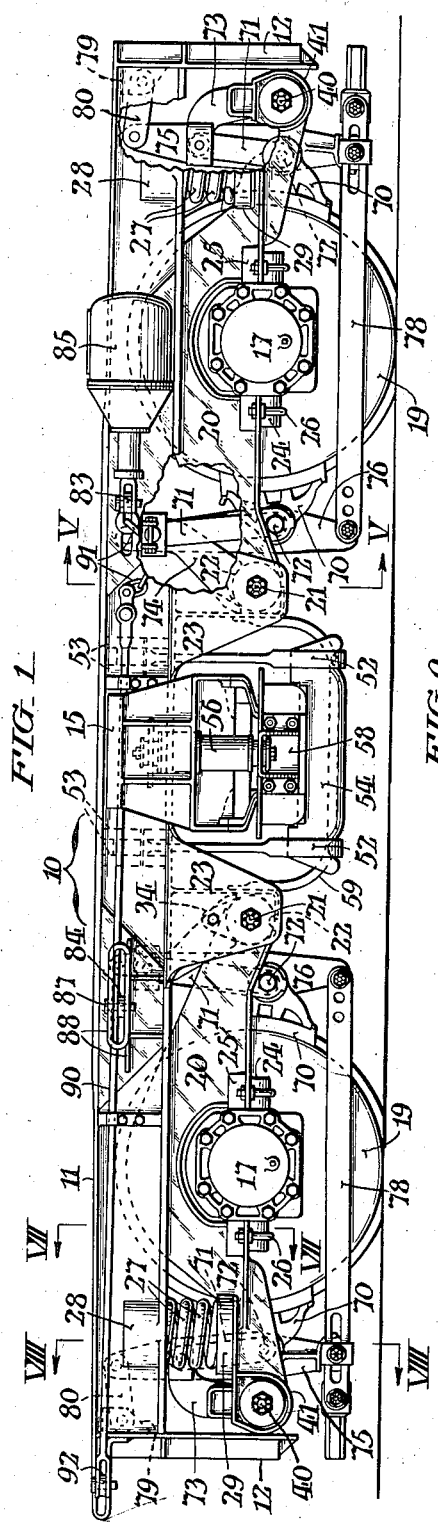
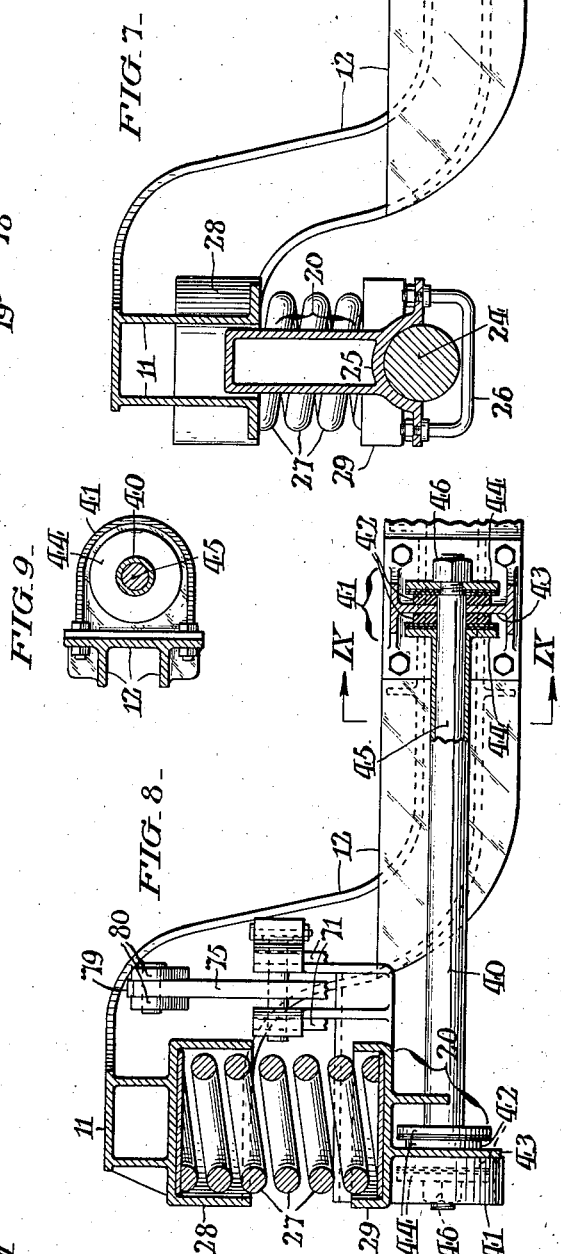
INVENTOR:
Warren R. Elsey,
BY Paul Paul
ATTORNEYS.

March 14, 1944. W. R. ELSEY 2,344,033
RAILWAY CAR TRUCK
Filed Nov. 20, 1940 3 Sheets-Sheet 2

INVENTOR:
Warren R. Elsey,
ATTORNEYS.

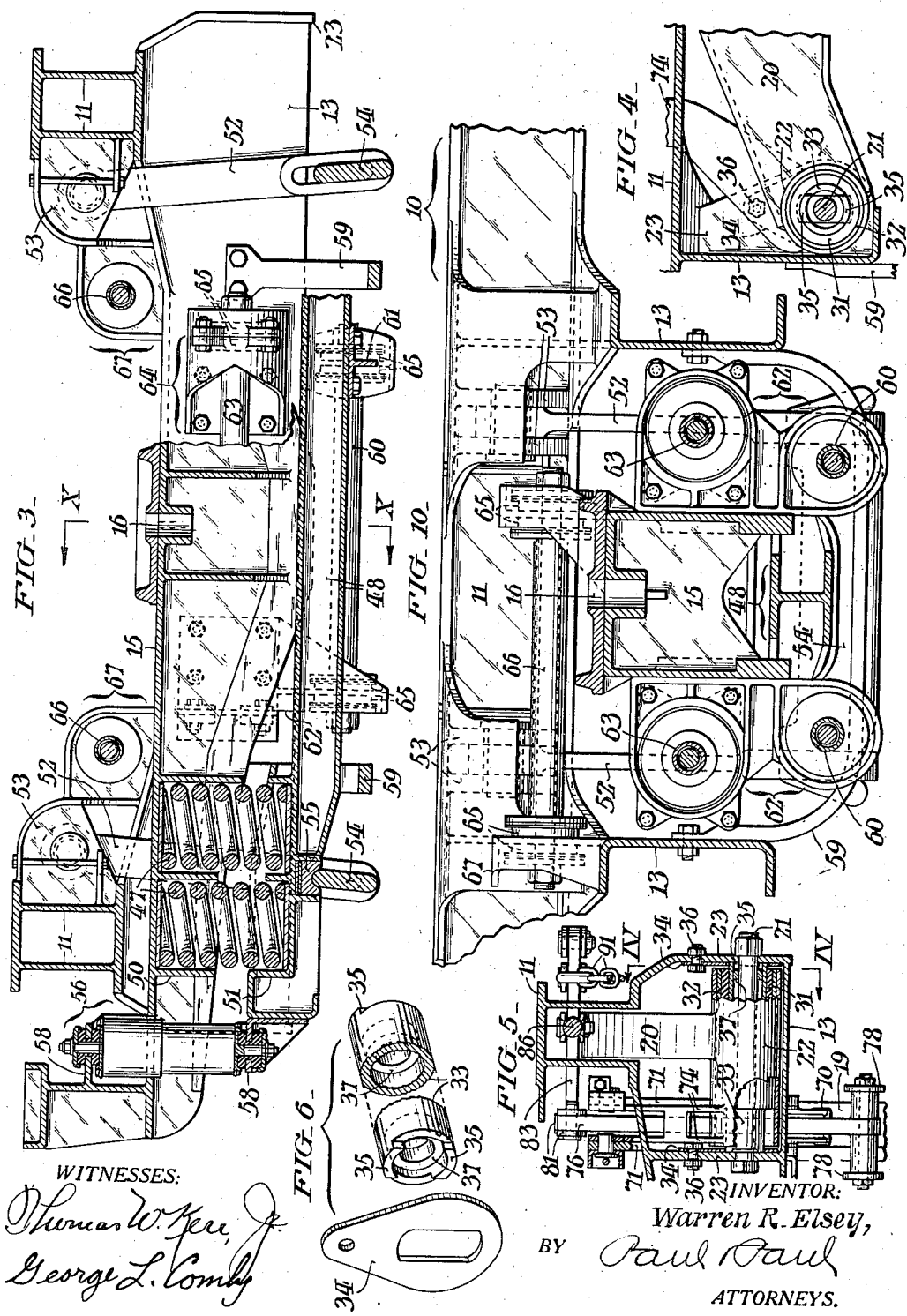

Patented Mar. 14, 1944

2,344,033

UNITED STATES PATENT OFFICE 2,344,033

RAILWAY CAR TRUCK

Warren R. Elsey, Wynnewood, Pa., assignor to The Pennsylvania Railroad Company, Philadelphia, Pa., a corporation of Pennsylvania Application November 20, 1940, Serial No. 366,344

10 Claims. (Cl. 105—218)

This invention relates to railway car trucks, and is especially concerned with the smooth-riding qualities of such trucks. Accordingly, the invention is adaptable and advantageous for trucks of passenger cars, and is hereinafter explained with particular reference to a bolster type truck of this character. Various features and advantages of the invention will become apparent from the following description of a species or form of embodiment, and from the drawings.

In the drawings, Fig. 1 is a side view of a truck conveniently embodying the invention, with portions of the truck frame and of one of the journal box mountings broken away; Fig. 2 is a plan view, likewise with certain parts broken away and in section; and Fig. 3 is a sectional view taken as indicated by the line and arrows III—III in Fig. 2.

Fig. 4, sheet 3, is a fragmentary sectional view, taken as indicated by the line and arrows IV—IV in Fig. 5, illustrating the pivoting of a journal-box mounting to the truck frame, and also the provisions for mounting the brake rigging; Fig. 5 is a fragmentary sectional view, taken as indicated by the line and arrows V—V in Figs. 1 and 2, also illustrating these features; and Fig. 6 is a fragmentary and "exploded" tilted view, illustrating details of the mounting-pivot arrangements.

Fig. 7, sheet 1, is a fragmentary sectional view, taken as indicated by the line and arrows VII—VII in Fig. 1; Fig. 8 is a similar view taken as indicated by the lines and arrows VIII—VIII in Figs. 1 and 2; and Fig. 9 is a fragmentary section taken as indicated by the line and arrows IX—IX in Figs. 2 and 8.

Fig. 10, sheet 3, is a fragmentary sectional view, taken as indicated by the lines and arrows X—X in Figs. 2 and 3.

As shown in Figs. 1, 2, and 3, the truck frame 10 consists of longitudinal side frames 11, 11 with transoms or cross-members 12, 12 and 13, 13 interconnecting them at their ends and at intermediate points. There is a load-carrying transverse bolster 15 substantially at mid-length of the truck, between the intermediate cross-members 13, 13, extending across under the side frames 11, 11 and having provisions 16 for a center pivot (not shown) to pivot the truck to the associated car body (not shown). The journal bearings 17 for the axles 18 of the truck wheels 19 (shown as of roller-bearing type) are mounted in openings by fore and aft members or mountings 20, which are pivoted to the side frames 11, 11 at 21 for independent vertical or up and down movement relative to the truck frame 10, the pivotal axes extending transversely of the truck, and being at the inner, adjacent ends of the mountings, at the mid-portion of the truck. For this purpose, as shown in Figs. 1, 4, and 5, the mountings 20 have apertured end hubs 22 between pairs of downward-extending apertured flanges or bearing brackets 23 on the side walls of each side frame 11. As shown in Figs. 1 and 7, each of the axle journal bearings 17 is pivoted to the members or mountings 20 about fore and aft axes consisting of trunnions 24 on said bearings which engage in semi-cylindrical bearing seats 25 on said mountings 20. Retainers in the form of stirrups 26 bolted to flanges on the bearing seats 25 may be provided to prevent disengagement of the trunnions 24 in case of derailment of the truck. Thus vertical angularity of an axle 18 due to movement of one of its wheels 19 up or down with reference to the truck frame 10 is accommodated without cramping either the journals and their boxes 17, or the mounting pivots at 21. The truck frame 10 is supported from the several wheel members or mountings 20 at the pivots 21 and through springs 27 (Figs. 1, 7, and 8) interposed between vertically aligned socketed top and lower seats 28, 29 on the side frames 11 and on the outer ends of said mountings 20, beyond the wheels 19 from the pivots 21. The several springs 27, it will be seen, independently cushion the movements of the several members or mountings 20 relative to the truck frame 10. As best shown in Figs. 1 and 5, the members or mountings 20, 20 at each side of the truck are substantially in vertical fore and aft alignment with the corresponding hollow side frame 11, and, indeed move up and down in the latter.

As illustrated in Figs. 4, 5, and 6, the mounting-pivots 21 in the openings of the frame brackets 23 extend through rubber bushings 31 in the bores of the mounting hubs 22, so that these bushings coact with the springs 27 in absorbing minor shocks and vibrations of high frequency, and in minimizing their transmission to the truck frame 10. Preferably, the bushings 31 also torsionally resist the turning and the up-and-down movement of the mountings 20 and the wheels 19 relative to the truck frame 10. The rubber bushing 31 may be restrainedly-connected, as by vulcanization, to external and internal metal sleeves 32, 33; and the sleeve 32 may be restrainedly-connected in the hub 22, as by a driving fit therein, while the sleeve 33 is restrainedly connected to the brackets 23, as by means of crank plates 34, 34. As shown in Figs. 5 and 6, the sleeve 33 has end lugs 35, 35 which engage in elongated openings in the crank plates 34, and the outer ends of the latter are attached to the brackets 23 by bolts 36. The sleeve 33 may be centered around the bolt 21 by means of collars 37, Figs. 5 and 6.

As shown in Figs. 1, 2, and 8, the mountings 20 are guided transversely of the truck, during their up and down movements relative to the truck frame 10, and are restrained against transverse displacement, by means of stay-rods 40 connected between the outer ends of the members or mountings 20 and the truck-frame cross-members 12, 12, and flexibly anchored to these parts at their ends, by means of anchorage brackets 41, Figs. 8 and 9. Thus any tendency to sway or cant the members or mountings 20 objectionably on their pivots 21 is effectually resisted. For flexibly connecting the stay-rods 40 at their ends, Fig. 8 shows rubber connectors interposed between the ends of each stay rod 40 and its anchorages 41, 41, each such connector comprising rubber discs 42, 42 at opposite sides of the bracket web 43, tightly clamped to said web between metal flanges 44, 44 on the end of the stay-rod 40. The stay-rod 40 may consist of an inner tension bar 45 extending through the parts 41, 42, 43, 44 and having clamping nuts 46, 46 on its ends, and an outer spacing sleeve against which the rubber discs 42, 42 at both ends of the rod 40 are held compressed by the nuts 46, 46. As the member or mounting 20 is positively attached to the truck frame 10 at its ends, by the resilient bushing 31 and the resiliently connected stay-rod 40, there is no opportunity for it to cant or work relative to the truck frame 10, or for any looseness or rattle to develop. Vibration is effectively absorbed, yet all necessary flexure is easily and freely permitted.

As shown in Figs. 1, 2, 3, and 10, the bolster 15 is of an inverted channel section, and is resiliently supported from the truck frame 10 by means of helical compression springs 47 interposed between the bolster web and a transverse spring plank 48 directly under the bolster, and having their ends engaged in sockets 50, 51 on the bolster and on the spring plank. The spring plank 48 may be supported from the truck frame 10 by means of transversely swinging suspension links 52 pivotally hung from brackets 53 on the side frames 11, 11, and pivotally connected to the ends of a yoke 54 rockingly engaged with a bearing 55 at the under side of the spring plank 48. The up and down or vertical movement of the bolster 15 relative to the truck frame 10 may be regulated by means of hydraulic shock-absorbers 56 extending through openings in the channel web of the bolster, and connected between brackets 58, 58 on the bolster ends and on the ends of the spring plank 48. Emergency supports 59 are shown extending across between the cross-members 13, 13 under the spring plank 48, to prevent the latter from falling on the track if its supporting means 52, 53, 54 should fail.

For controlling the position of the spring plank 48 and of the bolster 15 transversely of the truck—their lateral movement, in other words—there are transverse stay-rods 60, 60 alongside the spring plank at either side, with their ends flexibly anchored to the spring plank 48 and to the bolster 15 by means of anchorage brackets 61, 62 attached to these parts; and there are also transverse stay-rods 63, 63 alongside the bolster 15 at either side, with their ends flexibly anchored to said bolster and to the truck frame cross members 13, 13 by means of anchorage brackets 62 and 64. The construction of the stay-rods 60, 60 and 63, 63 and their connections to their anchorage brackets 61, 62, 64, may be similar to the corresponding features already described in connection with the stay-rods 40, including rubber discs 65 similar to the discs 42. The position and movement of the bolster 15 fore and aft of the truck may be similarly controlled, by means of fore and aft stay-rods 66, 66 having their ends flexibly connected to anchorage brackets 67 upstanding from the bolster 15 and from the truck-frame cross-members 13, 13, these stay-rods 66 and anchorage brackets 67 and their associated parts being similar to what has been indicated for the stay-rods 40, 60, 63, including rubber discs 65 similarly arranged.

The truck frame 10 and its bolster 15 and journal box mountings 20 may be of any preferred construction, and may preferably be built up of sheet metal pieces welded together along the edges or sides of each that meet another or abut laterally against another, so that they virtually form one piece (as indicated in the drawings by apparent continuity of the metal where such pieces meet), while various accessory brackets or other parts may consist of forgings welded on.

In accordance with my invention, the brake mechanism for the truck wheels 19 is mounted (in the main, at least) on the several journal box members or mountings 20, so that the relations of the brake shoes 70 to their wheels 19 are not affected by movement of the mountings 20 and wheels 19 relative to the truck frame 10. This is particularly illustrated in Figs. 1, 2, 4, and 5. As shown in Fig. 1, the brakes are of the clasp type, and the brake shoes 70, 70 at opposite sides of each wheel 19 are suspended by upright double hangers 71, 71 (pivoted to the brake shoes 70 and 72) from upstanding double supporting arms 73, 74 on the member or mounting 20, the arms 73 being on the free end of said mounting beyond its spring seat 29, and the arms 74 being attached to the mounting hub 22 adjacent its inner bearing bracket 23, between the inner side of the side frame 11 and the bracket 23, which as shown in Fig. 5 projects substantially inward from said side frame.

For operating the brake shoes 70, there are shown upright dead and live truck levers 75, 76 pivotally attached to the shoes 70 (by their hanger pivots 72), and having their lower ends interconnected by double links 78 that are preferably adjustable in length. The upper end of each dead truck lever 75 is shown as fulcrumed on a bracket 79 on the corresponding frame cross-member 12 by means of an interposed link 80, while the upper end of each live truck lever 76 is connected by interlinked clevises 81 to the inner end of a horizontal lever 83 or 84. Thus the truck levers 75, 76 are supported from the member or mounting 20 by the hangers 71, 71 and are connected to their respective means 79 and 83 or 84 with all needful freedom for movement with the mounting relative to the frame 10. In the present instance, the brakes for the wheels 19, 19 at each side of the truck are operated by a common power cylinder 85 mounted on the outside of the truck frame 10. For this purpose, the levers 83, 84 at each side of the truck are interconnected intermediate their ends by a link-rod 86 inside the hollow side frame 11, and the piston rod of the cylinder 85 is connected to the outer end of the lever 83, while the outer end of the lever 84 is fulcrumed at 87 on a bracket 88 attached to the side frame 11.

Emergency connections for manual operation of the brakes for both sides of the truck are indicated in Figs. 1 and 2 by link-rods 90 extending along the outsides of the side frames 11 and each having one end connected to the corresponding lever 83 by a normally slack chain 91, while its other end is connected to the outer end of a horizontal lever 92 that is intermediately fulcrumed on the end of the truck frame at 93 and has its inner end connected to an operating rod 95 leading to any suitable manual operating means, not shown.

Having thus described my invention, I claim:

1. In a railway car truck, the combination of a load-carrying truck comprising side frames with connecting cross members; truck wheels and axles; journal box mountings pivoted to the side frames with provision for independent up and down movement, the pivots of said mountings each including a resilient bushing which is restrainedly connected to the associated side frame and mounting against relative turning in order to torsionally resist movement of said mounting about the pivot; spring means interposed between the truck side frames and the several mountings for independently cushioning their relative movement; a stay-rod for guiding each mounting transversely of the truck during its up and down movement; and resilient connectors interposed between the ends of said stay-rods and their anchorages, to the respective mountings and cross members, to permit flexure and for absorbing vibration thereat.

2. The combination of claim 1 wherein each journal box has fore and aft trunnions for pivotal coaction with a semi-cylindrical bearing seat on the associated mounting, and stirrup-like retainers are attached to the bearing seat to prevent accidental disengagement of the respective trunnions from said bearing seat.

3. The combination of claim 1 wherein the resilient bushings for the pivots of the journal box mountings are made of rubber anti-turningly attached to external and internal metal sleeves and rubber discs are incorporated in the end connections of the stay-rods to permit flexure thereat and to absorb high frequency vibrations of the journal boxes.

4. The combination of claim 1 wherein at least one end connection of each stay-rod is in the form of a resilient mounting to permit angular movement of the rod.

5. In a railway truck, a wheeled axle, a member supported on said axle and extending longitudinally of the truck in opposite directions from the axle, a truck frame including a wheel piece extending over said member and a transverse end rail extending inwardly of the truck adjacent one end portion of said member, a pivot connection between the other end of said member and said frame, a spring carried on said member and supporting the frame, and an anchor rod extending between and having yielding connections to said first-mentioned end portion of said member and to a part of said end rail spaced therefrom to resist and cushion transverse forces applied between said member and frame while yieldingly permitting relative angular movement of said frame and member in a vertical longitudinal plane about said pivot connection.

6. In a railway truck, a wheeled axle, a member supported on said axle and extending longitudinally of the truck in opposite directions from said axle, a truck frame including a portion extending above said member, a spring carried on said member and supporting said frame, there being a connection between one end of said member and said frame portion, said connection including a resilient element interposed between said member and frame portion, an elongated device extending transversely of the truck and resiliently connecting the other end of said member and said frame, said first-mentioned connection and said device permitting angular movement of said member and said frame portion about said first-mentioned connection in a vertical longitudinal plane, said first-mentioned connection and said device resisting and cushioning transverse forces applied between said member and said frame.

7. In a railway car, a truck frame having side longitudinals embodying inverted channel section portions and connecting cross-members; wheel axle journal members pivoted at longitudinally spaced points to the side longitudinals for vertical movement; springs interposed between the side longitudinals and the free ends of the respective wheel axle journal members; a transverse spring plank floatingly-suspended from the side longitudinals intermediate the wheels; and a bolster sustained with interposition of springs beneath its ends by the spring plank for movement both longitudinally and laterally of the truck, and extending outward between the pivot points aforesaid as well as beneath and beyond the frame longitudinals to provide bearing for the car body.

8. A railway car according to claim 7, in which the wheel axle journal members are pivoted within and extend upward into the hollow of the longitudinals.

9. A railway car according to claim 7, further including means for yieldingly-limiting the movement of the spring plank and the bolster, relative to each other and to the truck frame both longitudinally and laterally.

10. A railway car according to claim 7, in which the pivots for the wheel axle journal members allow lateral movements of the free ends of said members, and further including means for yieldingly-connecting the free ends of said members to the truck frame to limit such lateral movement.

WARREN R. ELSEY.